United States Patent
Gainey et al.

(10) Patent No.: US 8,553,610 B2
(45) Date of Patent: *Oct. 8, 2013

(54) INTERFERENCE CANCELLATION REPEATER INCORPORATING A NON-LINEAR ELEMENT

(75) Inventors: Kenneth M. Gainey, San Diego, CA (US); James A. Proctor, Jr., Melbourne Beach, FL (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 13/106,656

(22) Filed: May 12, 2011

(65) Prior Publication Data

US 2012/0287968 A1  Nov. 15, 2012

(51) Int. Cl.
*H04J 1/12* (2006.01)
*H04B 7/185* (2006.01)
*H04B 1/10* (2006.01)

(52) U.S. Cl.
USPC ............ 370/317; 370/201; 370/286; 455/296

(58) Field of Classification Search
USPC ......... 370/315–317, 201, 278, 282, 286–290; 455/24, 283, 284, 296, 298, 299, 303–312
See application file for complete search history.

(56) References Cited

U.S. PATENT DOCUMENTS

| | | | |
|---|---|---|---|
| 6,181,794 B1 * | 1/2001 | Park et al. | 370/291 |
| 6,600,792 B2 | 7/2003 | Antonio et al. | |
| 6,931,080 B2 | 8/2005 | Giardina et al. | |
| 8,073,385 B2 * | 12/2011 | Braithwaite et al. | 455/9 |
| 2007/0184782 A1 | 8/2007 | Sahota et al. | |
| 2007/0263704 A1 * | 11/2007 | Nagarajan et al. | 375/148 |
| 2010/0035554 A1 | 2/2010 | Ba et al. | |
| 2010/0232413 A1 | 9/2010 | Dakshinamurthy et al. | |
| 2010/0284280 A1 | 11/2010 | Gore et al. | |
| 2010/0285734 A1 * | 11/2010 | Black et al. | 455/7 |
| 2010/0285736 A1 * | 11/2010 | Gore et al. | 455/7 |
| 2010/0285737 A1 | 11/2010 | Gore et al. | |
| 2011/0170473 A1 | 7/2011 | Proctor, Jr. et al. | |

FOREIGN PATENT DOCUMENTS

EP  1569330 A1  8/2005

OTHER PUBLICATIONS

International Search Report and Written Opinion—PCT/US2012/037816, International Search Authority—European Patent Office, Jul. 23, 2012.

(Continued)

*Primary Examiner* — Kerri Rose
(74) *Attorney, Agent, or Firm* — Thien T. Nguyen

(57) ABSTRACT

A wireless repeater employing echo cancellation uses a non-linear element in digital baseband to compress the digital transmit signal waveform, thereby allowing distortions in the transmitter circuit as well as interference to be cancelled. In one embodiment, the repeater applies non-linear baseband compression to the digital transmit signal in the digital domain to reduce the peak-to-average amplitude of the digital transmit signal prior to digital-to-analog conversion and prior to over-the-air transmission and prior to sampling of the digital transmit signal for use as the reference signal for echo cancellation. The intentionally introduced non-linear distortion in the transmit signal improves echo cancellation and stability of the repeater. In one embodiment, the non-linear compression is applied only when the digital transmit signal is at or exceed a given power level or a given gain level.

20 Claims, 5 Drawing Sheets

(56) References Cited

OTHER PUBLICATIONS

Riihonen T. et al., "BEP Analysis of OFDM Relay Links with Nonlinear Power Amplifiers", Wireless Communications and Networking Conference (WCNC), 2010 IEEE, IEEE,Piscataway, NJ, USA, Apr. 18, 2010, pp. 1-6, XP031940379, D0I: 10.1109/WCNC.2010. 5506301 ISBN: 978-1-4244-6396-1 abstract; figure 1 paragraphs [0001], [000V].

* cited by examiner

INTERFERENCE CANCELLATION REPEATER INCORPORATING A NON-LINEAR ELEMENT

BACKGROUND

1. Field

This disclosure generally relates to repeaters in wireless communication systems, and in particular, to a wireless repeater implementing interference cancellation and incorporating a non-linear element in the cancellation loop.

2. Background

Wireless communication systems and techniques have become an important part of the way we communicate. However, providing coverage can be a significant challenge to wireless service providers. One way to extend coverage is to deploy repeaters.

In general, a repeater is a device that receives a signal, amplifies the signal, and transmits the amplified signal. FIG. 1 shows a basic diagram of a repeater 110, in the context of a cellular telephone system. Repeater 110 includes a donor antenna 115 as an example network interface to network infrastructure such as a base station 125. Repeater 110 also includes a server antenna 120 (also referred to as a "coverage antenna") as a mobile interface to mobile device 130. In operation, donor antenna 115 is in communication with base station 125, while server antenna 120 is in communication with mobile devices 130.

In repeater 110, signals from base station 125 are amplified using forward link circuitry 135, while signals from mobile device 130 are amplified using reverse link circuitry 140. Many configurations may be used for forward link circuitry 135 and reverse link circuitry 140.

There are many types of repeaters. In some repeaters, both the network and mobile interfaces are wireless; while in others, a wired network interface is used. Some repeaters receive signals with a first carrier frequency and transmit amplified signals with a second different carrier frequency, while others receive and transmit signals using the same carrier frequency. For "same frequency" repeaters, one particular challenge is managing the feedback that occurs since some of the transmitted signal can leak back to the receive circuitry and be amplified and transmitted again.

Existing repeaters manage feedback using a number of techniques; for example, the repeater is configured to provide physical isolation between the two antennae, filters are used, or other techniques may be employed.

SUMMARY

Systems, apparatuses, and methods disclosed herein allow for enhanced repeater capability. In one embodiment, a wireless repeater having a first antenna and a second antenna to receive an input signal and transmit an amplified signal where the input signal is a sum of a remote signal to be repeated and a feedback signal resulting from a feedback channel between the first antenna and the second antenna includes a first receiver circuit coupled to the first antenna to receive the input signal and to generate a digital input signals at baseband frequency, a first transmitter circuit coupled to generate the amplified signal to transmit on the second antenna where the amplified signal is generated from a compressed digital transmit signal at baseband frequency, and a repeater digital baseband block configured to receive the digital input signal from the first receiver circuit and to generate the compressed digital transmit signal for the first transmitter circuit. The repeater baseband block is operative to access a feedback signal estimate, to cancel the feedback signal estimate from the digital input signal to generate an echo cancelled signal, to delay the echo cancelled signal to generate a delayed signal, and to amplify and process the delayed signal to generate a first digital transmit signal. The repeater digital baseband block is further configured to apply non-linear baseband compression of the first digital transmit signal to generate the compressed digital transmit signal. In operation, the repeater baseband block is configured to access a feedback signal estimate using the compressed digital transmit signal as a reference signal.

According to another embodiment of the present invention, a method in an echo cancellation repeater includes receiving an input signal at a first antenna of the repeater where the input signal is a sum of a remote signal to be repeated and a feedback signal resulting from a feedback channel between the first antenna and a second antenna; digitizing the input signal to generate a digital input signal at baseband frequency; cancelling a feedback signal estimate from the digital input signal to generate an echo cancelled signal; delaying the echo cancelled signal to generate a delayed signal; amplifying and processing the delayed signal to generate a first digital transmit signal; applying non-linear baseband compression to the first digital transmit signal to generate a compressed digital transmit signal; sampling the compressed digital transmit signal as a reference signal to access a feedback channel estimate of the feedback channel; generating the feedback signal estimate using at least the feedback channel estimate and the reference signal, the feedback signal estimate being used to cancel a feedback signal component of the digital input signal; generating an amplified signal from the compressed digital transmit signal; and transmitting the amplified signal on the second antenna of the repeater.

DETAILED DESCRIPTION

The nature, objectives, and advantages of the disclosed method and apparatus will become more apparent to those skilled in the art after considering the following detailed description in connection with the accompanying drawings.

Prior art repeaters such as those described above may provide significant advantages for cellular telephone or similar networks. However, existing repeater configurations may not be suitable for some applications. For example, existing repeater configurations may not be suitable for indoor coverage applications (e.g., repeating signals for a residence or business environment) which may require substantially more isolation between the repeater's antennas. Moreover, in some traditional repeater implementations, the target is to achieve as high a gain as reasonable while maintaining a stable feedback loop (loop gain less than unity). However, increasing the repeater gain renders isolation more difficult due to the increased signal leaking back into the donor antenna. In general, loop stability demands require that the signal leaking back into the donor antenna from the coverage antenna be much lower than the remote signal (the signal to be repeated). The maximum achievable signal to interference/noise ratio (SINR) at the output of the repeater is then the same as the SINR at the input to the repeater. High gain and improved isolation form two contradicting demands required for modern day repeaters, especially those for indoor applications.

Figure 1:
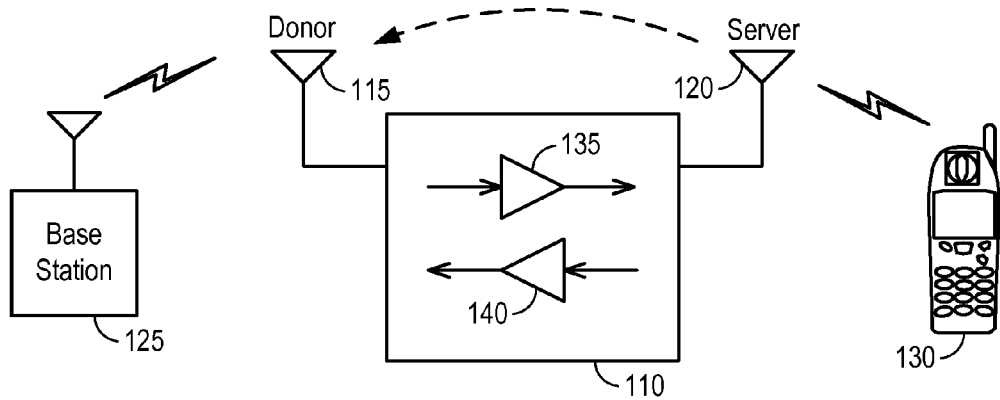
FIG. 1 is a simplified diagram of a repeater according to the prior art.
Figure 2:
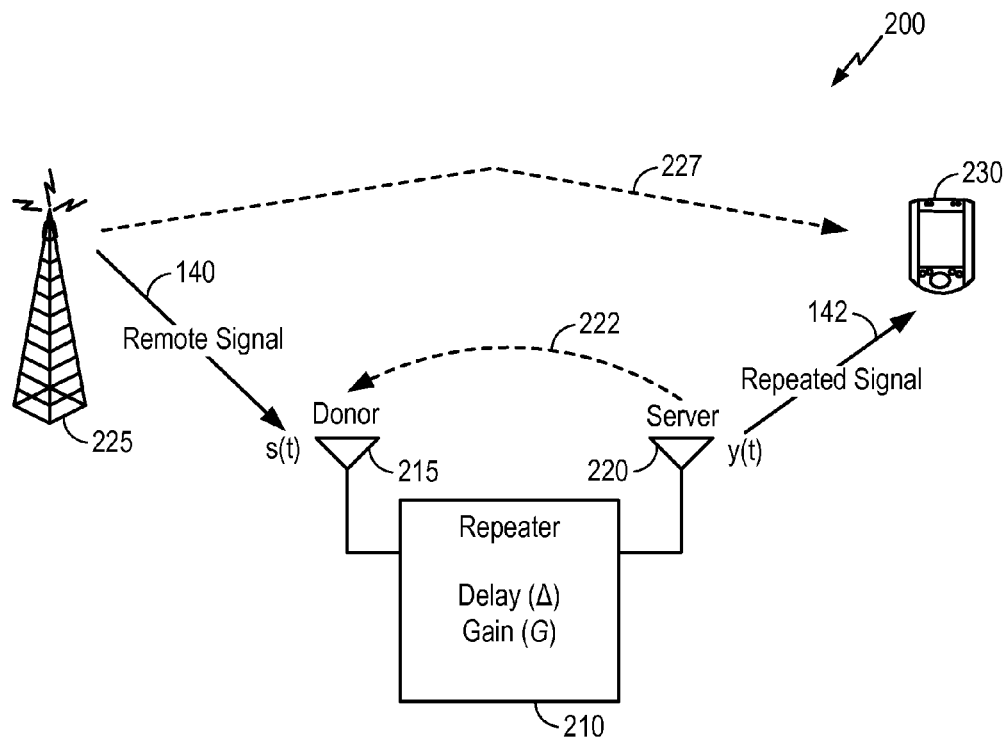
FIG. 2 shows a diagram of a repeater environment according to some embodiments of the present invention.

FIG. 2 shows a diagram of an operating environment 200 for a repeater 210 according to embodiments of the present invention. In FIG. 2, a remote signal 140 from a base station 225 is intended for a mobile device 230. A repeater, such as repeater 210, may be used in environment 200 if an unrepeated signal along the path 227 between base station 225 and mobile device 230 would not provide sufficient signal for effective voice and/or data communications received at mobile device 230. Repeater 210 with a gain G and a delay $\Delta$ is configured to repeat a signal received from base station 225 on a donor antenna 215 ("the receiving antenna") and amplify and transmit the signal to mobile device 230 using a server antenna 220 ("the transmitting antenna"). Repeater 210 includes forward link circuitry for amplifying and transmitting signals received from the base station 225 to mobile device 230 through donor antenna 215 and server antenna 220. Repeater 210 may also include reverse link circuitry for amplifying and transmitting signals from mobile device 230 back to base station 225. At repeater 210, the remote signal s(t) is received as an input signal and the remote signal s(t) is repeated as a repeated or amplified signal y(t) where y(t)= $\sqrt{G}$s(t–$\Delta$). Ideally, the gain G would be large, the inherent delay $\Delta$ of the repeater would be small, the input SINR would be maintained at the output of repeater 210 (this can be of particular importance for data traffic support), and only desired carriers would be amplified.

In practice, the gain of repeater 210 is limited by the isolation between donor antenna 215 and server antenna 220. If the gain is too large, the repeater can become unstable due to signal leakage. Signal leakage refers to the phenomenon where a portion of the signal that is transmitted from one antenna (in FIG. 2, server antenna 220) is received by the other antenna (in FIG. 2, donor antenna 215), as shown by the feedback path 222 in FIG. 2. Without interference cancellation or other techniques, the repeater would amplify this feedback signal, also referred to as the leakage signal, as part of its normal operation, and the amplified feedback signal would again be transmitted by server antenna 220. The repeated transmission of the amplified feedback signal due to signal leakage and high repeater gain can lead to repeater instability. Additionally, signal processing in repeater 210 has an inherent non-negligible delay $\Delta$. The output SINR of the repeater is dependent on RF non-linearities and other signal processing. Thus, the aforementioned ideal repeater operational characteristics are often not attained. Finally, in practice, the desired carriers can vary depending on the operating environment or market in which the repeater is deployed. It is not always possible to provide a repeater that amplifies only the desired carriers.

In a same-frequency repeater, the incoming signal is retransmitted on the same frequency as which it is received. In cases where higher gain is desired and there is insufficient isolation in the antennas, interference cancellation is often used to increase the stability of the repeater and increase the overall gain.

In embodiments of the present invention, a wireless repeater employs interference cancellation or echo cancellation to improve the isolation between the repeaters' donor antenna ("the receiving antenna" for forward link communications) and the server antenna ("the transmitting antenna" for forward link communications). Interference cancellation is accomplished by actively cancelling out the transmit signal received on the repeater's own receive signal, referred to as the "leakage signal" or the "feedback signal." In some cases, interference cancellation is carried out in baseband, that is in the digital domain. Baseband interference cancellation is accomplished by storing a digital reference of the signal to be transmitted and using this digital reference to estimate the feedback channel. The feedback channel estimate is then use to estimate the feedback signal so as to actively cancel the leakage signal.

More specifically, the echo cancellation process involves estimating the feedback channel using the transmit signal as a reference signal, convolving the feedback channel estimate with the transmit signal to generate a feedback signal estimate, and applying the feedback signal estimate to cancel the undesired feedback signal in the receive signal. Effective echo cancellation requires very accurate channel estimation of the leakage channel. In general, the more accurate the channel estimate, the higher the cancellation and hence the higher the effective isolation. Herein, "interference cancellation" or "echo cancellation" refers to techniques that reduce or eliminate the amount of leakage signal between repeater antennas; that is, "interference cancellation" refers to partial or complete cancellation of the leakage signal.

One issue with baseband interference cancellation is that the transmitter must be very linear so as to not cause distortion between the digital transmit signal used as the reference signal and the analog transmitted signal. This linearity requirement limits the overall level to which the transmitter may be driven beyond typical levels in other applications or beyond that required to achieve spectral compliance with regulatory agencies. The result is a reduction in transmitter power, or an increased expense in the analog components, such as power amplifiers or digital-to-analog converters, of the repeater.

According to embodiments of the present invention, a wireless repeater employing echo cancellation uses a non-linear element in digital baseband to compress the digital transmit signal waveform, thereby allowing distortions in the transmitter circuit as well as interference to be cancelled. More specifically, the repeater includes a non-linear element operative to apply non-linear baseband compression to the digital transmit signal in the digital domain to reduce the peak-to-average amplitude of the digital transmit signal prior to digital-to-analog conversion and prior to over-the-air transmission and prior to sampling of the digital transmit signal for use as the reference signal for echo cancellation. In one embodiment, the wireless repeater implements "smart clipping" where compression by the non-linear element is applied to the digital transmit signal when the digital transmit signal is at or exceed a certain power level or a certain gain level to control the peak-to-average amplitude ratio. In this manner, headroom requirements for the transmit train, that is, the entire transmit circuitry, of the repeater can be reduced.

Figure 3:
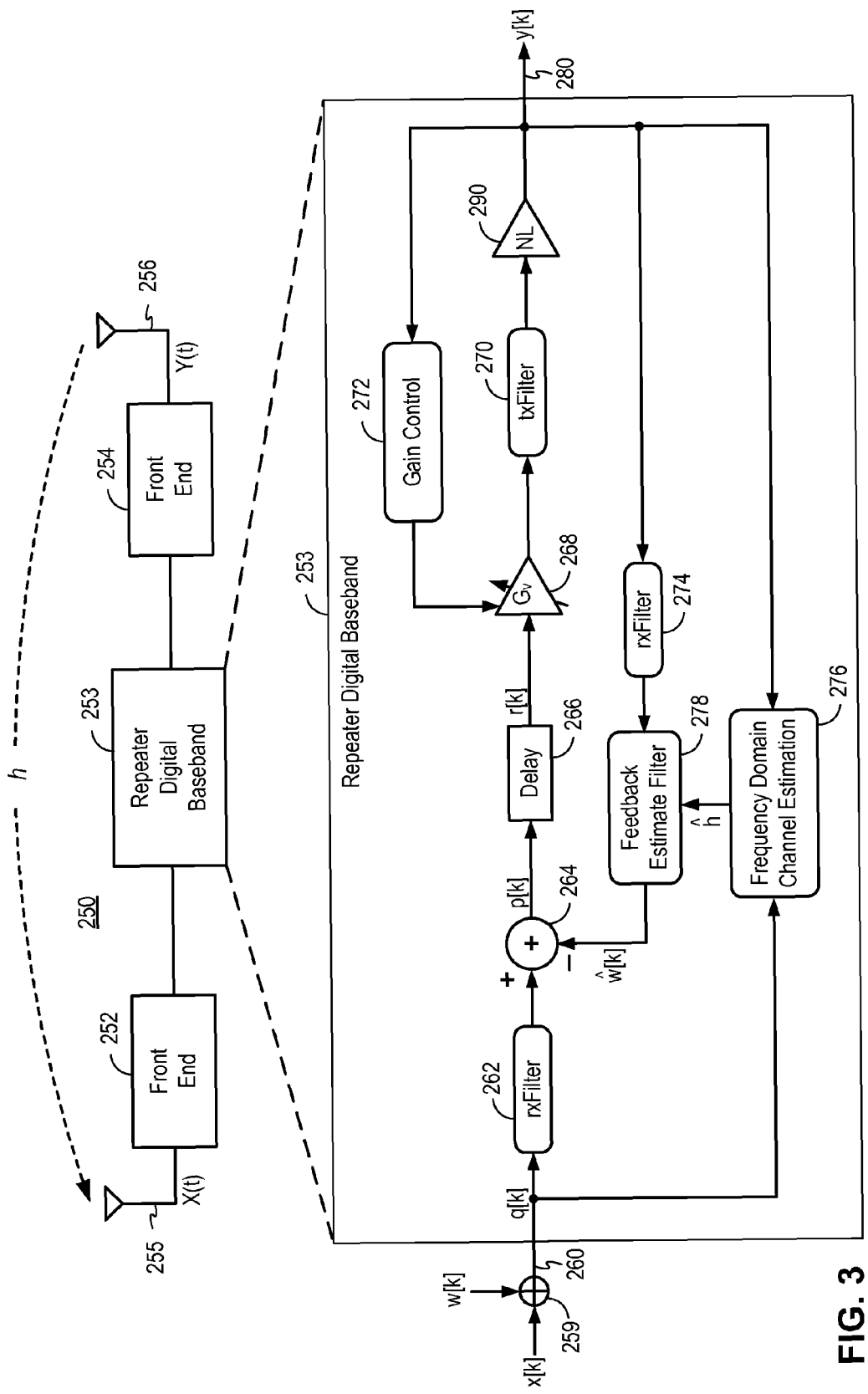
FIG. 3 is a schematic diagram of an interference cancellation repeater incorporating a non-linear element according to one embodiment of the present invention.

FIG. 3 is a schematic diagram of an interference cancellation repeater incorporating a non-linear element according to one embodiment of the present invention. Referring to FIG. 3, an interference cancellation repeater 250 receives a remote signal X(t) on a donor antenna 255 ("the receiving antenna"

for forward link communications) to be repeated and generates an output signal Y(t) to be transmitted on a server antenna 256 ("the transmitting antenna" for forward link communications). The repeater 250 includes a first front-end circuit 252 coupled to the donor antenna 255, a second front-end circuit 254 coupled to the server antenna 256, and a repeater digital baseband block 253 coupled between the first and second front-end circuits.

The first and second front-end circuits 252, 254 incorporate digital and analog front-end processing circuitry for implementing the receive and transmit functions of the wireless repeater. In general, the front-end circuits include receive and transmit circuits for receiving and transmitting analog signals. The receive and transmit circuits include digital signal processors for converting analog signals into digital signals and converting digital signals to analog signals. In one embodiment, the first and second front-end circuits 252, 254 each includes variable gain amplifiers, power amplifiers, filters, mixers, drivers, analog-to-digital converters and digital-to-analog converters. The specific implementation of the repeater front-end circuits 252, 254 is not critical to the practice of the present invention and any receiver/transmitter front-end processing circuitry, presently known or to be developed, can be applied in the wireless repeater of the present invention.

In operation, signal leakage from the transmitting antenna (such as the server antenna 256) back to the receiving antenna (such as the donor antenna 255) of the repeater 250 causes part of the output signal Y(t) to be leaked back through a feedback channel h and added to the remote signal X(t) before the signal is received by the repeater. Thus, the repeater 250 actually receives a composite receive signal being the sum of the remote signal X(t) and a feedback signal where the feedback signal is basically an attenuated version of the output signal Y(t).

The repeater 250 includes the repeater digital baseband block 253 where channel estimation, baseband echo cancellation, and gain control operations are implemented. The repeater digital baseband block 253 receives a digital receive signal q[k] and generates an output signal y[k], also referred to as a digital transmit signal, being the signal to be transmitted. The digital receive signal q[k] is a composite receive signal being the sum of the remote signal x[k] to be repeated and a feedback signal w[k] resulting from the feedback channel between the donor antenna 255 and the server antenna 256, as described above. In FIG. 3, the digital receive signal q[k] on input node 260 is represented as being the sum of the remote signal x[k] and the feedback signal w[k] through a summer 259. Summer 259 in FIG. 3 to sum signals x[k] and w[k] is symbolic only to illustrate the signal components of the digital receive signal q[k] and does not represent an actual signal summer in the repeater 250. The repeater 250, being an interference cancellation repeater, operates to estimate the feedback signal w[k] in order to cancel out the undesired feedback signal component in the receive signal.

In the repeater digital baseband block 253, the digital receive signal q[k] ("the input signal") on input node 260 is coupled to a receive filter 262 ("rxFilter"). In one embodiment, receive filter 262 is a tunable, digital baseband receive filter to enable appropriate filtering of the received signal waveform. The filtered receive signal is coupled to an echo canceller implementing echo cancellation. In one embodiment, the echo canceller implements frequency domain echo cancellation. In the present embodiment, the echo canceller includes a summer 264 which operates to subtract a feedback signal estimate ŵ[k] from the filtered receive signal. As long as the feedback signal estimate is accurate, all or some of the undesired feedback signal is removed from the digital receive signal q[k] and echo cancellation is realized.

The post cancellation signal p[k], also referred to as the echo cancelled signal, is coupled through a delay element 266 having a delay D1. The delay element 266 introduces a sufficient amount of delay to decorrelate the echo cancelled signal from the remote signal x[k] while maximizing the correlation between a reference signal for channel estimation and the leakage signal component of the composite receive signal. The delayed echo cancelled signal r[k] is coupled to a variable gain stage 268 providing a variable gain of $G_v$. The variable gain stage 268 is controlled by a gain control block 272 for adjusting the gain of repeater 250 through baseband gain modifications. In the present embodiment, the gain control block 272 implements digital gain control using the digital transmit signal y[k] as the reference signal and using one or more gain control algorithms, currently known or to be developed.

The amplified echo cancelled signal is coupled to a transmit filter 270 ("txFilter") to generate the digital transmit signal y[k] on an output node 280. In the present embodiment, the filtered transmit signal from the transmit filter 270 is coupled through a non-linear element 290, to be described in more detail below, to generate the digital transmit signal y[k]. In one embodiment, the transmit filter 270 is a tunable, digital baseband transmit filter to enable appropriate filtering of the transmit waveform. The output signal y[k] from the repeater digital baseband block 253 is coupled to the second front-end circuit 254 to be converted into analog signals and transmitted onto server antenna 256 as the final output signal Y(t).

In FIG. 3, only the forward link circuitry of repeater 250 for amplifying signals received on donor antenna 255 and transmitting signals on server antenna 256 is shown. Repeater 250 may also include reverse link circuitry for amplifying signals received on the server antenna 256 for transmission on the donor antenna 255.

To implement echo cancellation, the repeater digital baseband block 253 includes a channel estimation block 276 which operates to estimate the feedback channel h, and generate a feedback channel estimate ĥ. The echo canceller in the repeater digital baseband block 253 further includes a feedback signal estimate computation block (or "feedback estimate filter") 278 which uses the feedback channel estimate ĥ from the channel estimation block 276 to compute the feedback signal estimate ŵ[k]. In the present embodiment, the reference signal used for channel estimation and feedback signal estimation is the digital transmit signal y[k]. The reference signal for feedback signal estimation is coupled through a receive filter 274 before being used by the feedback estimate filter 278 to compute the feedback signal estimate. In this manner, the feedback signal estimate incorporates the same characteristics of the receive filter.

In one embodiment, the channel estimation circuit 276 employs frequency domain channel estimation using the digital transmit signal y[k] as the reference signal. The feedback channel estimate ĥ as thus computed is coupled to the feedback signal estimate block 278. Feedback signal estimate block 278 performs a convolution of the feedback channel estimate ĥ with the reference signal which passed through the receive filter 274, to generate the feedback signal estimate ŵ[k]. The feedback signal estimate ŵ[k] is coupled to summer 264 to be subtracted from the filtered receive signal to realize echo cancellation of the receive signal. Accordingly, the repeater 250 increases the effective isolation between the donor antenna and the server antenna through baseband interference cancellation. With accurate baseband echo cancellation, the repeater 250 is capable of being operated at a high gain level as compared to conventional repeater devices.

According to embodiments of the present invention, the repeater digital baseband block 253 incorporates non-linear element 290 to perform non-linear baseband compression of the desired transmit signal after echo cancellation but within the echo cancellation loop to limit the peak-to-average amplitude ratio of the signal to a desired level prior to transmission. That is, the non-linear baseband compression is carried out in the digital domain rather than at in the analog domain. In the present embodiment, the non-linear element 290 is placed after the transmit filter 270 to generate a digital transmit signal y[k] which is compressed. The compressed digital transmit signal is then provided to the second front-end circuit 254 to be converted to analog form for transmission. The compressed digital transmit signal y[k] will include non-linear distortions as a result of the artificial compression by non-linear element 290.

In embodiments of the present invention, the non-linear element 290 is implemented as a digital limiter function operative to scale the digital bits of the desired digital transmit signal. In one embodiment, the digital limiter function operates to limit the maximum amplitude of the digital transmit signal. Furthermore, in some embodiments, an exemplary amount of non-linear baseband compression is around −3 dB. In other embodiments, the amount of non-linear baseband compression is programmable, such as by the user of the repeater.

In one embodiment, the compression provided by the non-linear element 290 is applied continuously to all digital transmit signal provided to the non-linear element. In another embodiment, the repeater baseband block 253 implements "smart clipping" where compression by the non-linear element 290 is applied to the digital transmit signal when the transmit signal is at or exceed a certain power level, or at or exceed a certain gain level, to control the peak-to-average amplitude ratio. In this manner, headroom requirements on the power amplifier or the digital-to-analog converter of the repeater can be reduced.

Figure 4:
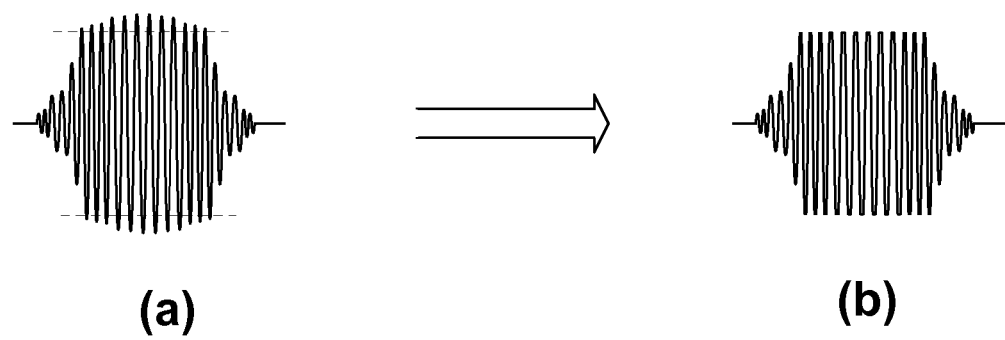
FIG. 4 illustrates the operation of the non-linear baseband compression by the non-linear element in the time domain according to one embodiment of the present invention.

FIG. 4 illustrates the operation of the non-linear baseband compression by the non-linear element in the time domain according to one embodiment of the present invention. The desired transmit signal, as shown in FIG. 4(a), includes peak-to-average amplitude ratio that exceeds a desired level, as indicated by the dotted line in FIG. 4(a). The non-linear baseband compression by the non-linear element scales the digital bits of the desired digital transmit signal so that the amplitudes of the signal is limited to the desired level, as shown in FIG. 4(b).

Importantly, the non-linear element 290 operates to compress the transmit waveform in the digital domain and prior to the point where the transmit signal is sampled as the reference signal for channel estimation. Thus, the distortion resulting from the non-linear element is captured by the reference signal used for channel estimation and echo-cancellation. The reference signal, including the distortion caused by the non-linear element 290, can be used to effectively cancel out the feedback signal as well as any distortion to the feedback signal caused by the transmit circuit in the second front-end circuit 254. The non-linear element 290 applies compression to a point where additional non-linear distortion due to RF components in the front-end circuits is minimal and acceptable to the performance of the cancelation process.

The use of the non-linear element in the repeater digital baseband of a repeater to compress the transmit waveform to introduce intended distortion provides many advantages. First, compression of the transmit waveform improves the output power of the transmitter by reducing the peak-to-average amplitude of the transmit waveform and allowing a higher average drive level to be used at the output power amplifier. The headroom requirement for the entire transmit train can be reduced by a significant amount. In the present description, the transmit train refers to the transmit circuitry in the repeater for receiving the digital transmit signal y[k] and generating an analog transmit signal Y(t) for transmission on the transmitting antenna. The transmit train includes analog and digital circuitry, such as power amplifiers and digital-to-analog converters. When the headroom requirement is reduced, an increase in the average transmit power using the same transmitter components can be realized. Alternately, a reduction in the cost for the same output power can be realized. That is, the same output power can be achieved with a less costly power amplifier.

Second, the overall robustness of the repeater system is increased. More specifically, any non-linear distortion which would occur in the transmitter and potentially cause cancelation issues resulting in oscillation would be prevented as the non-linear distortion is captured in the reference signal. The compression of the transmit waveform will allow for a controlled degradation of the repeater feedback system as opposed to a potentially catastrophic break down of the stability of the repeater feedback loop.

Figure 5:
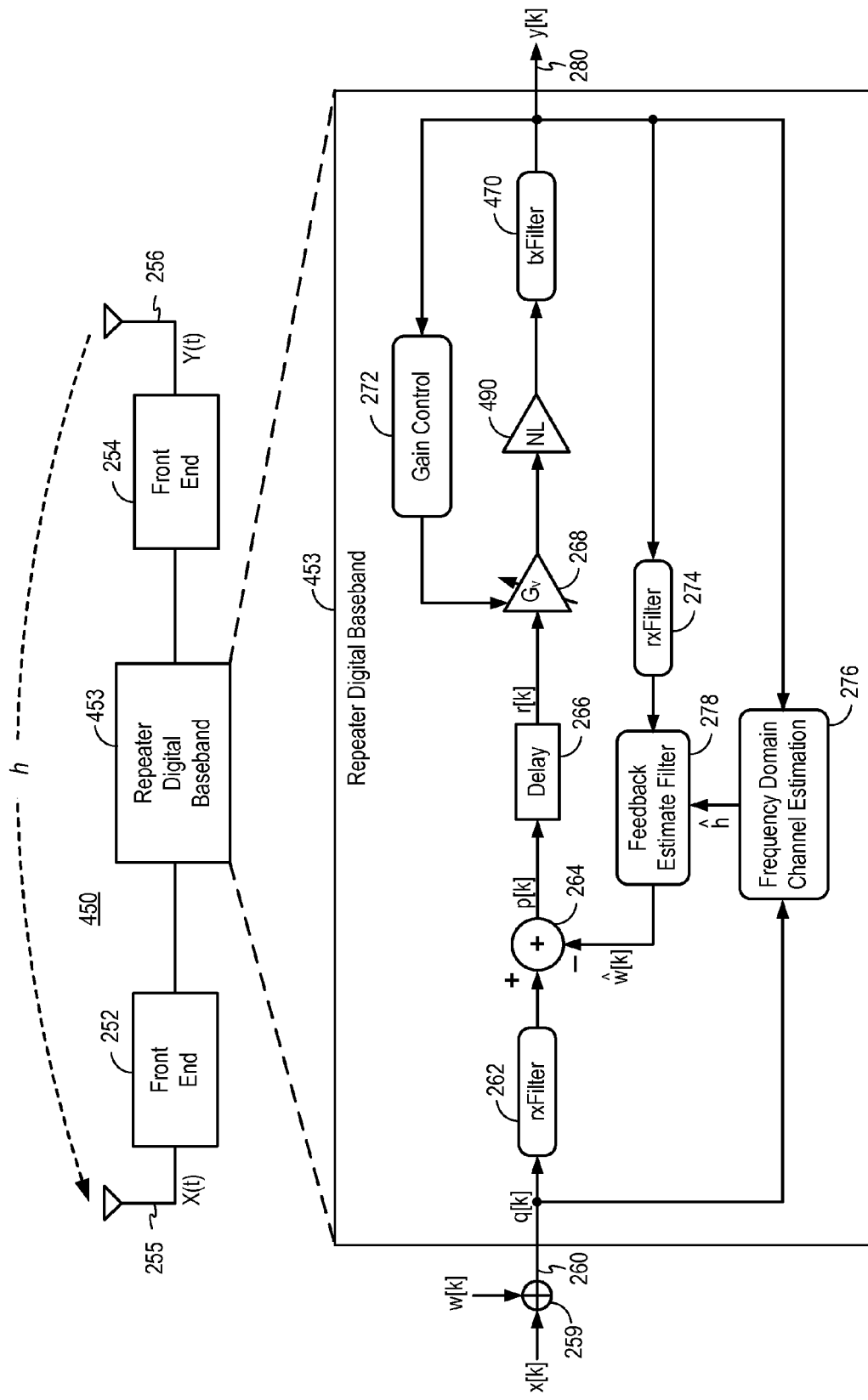
FIG. 5 is a schematic diagram of an interference cancellation repeater incorporating a non-linear element according to an alternate embodiment of the present invention.

In the embodiment shown in FIG. 3, the non-linear element 290 is placed before the transmit filter 270. The non-linear element 290 thus has the effect of reducing the number of bits for the subsequent digital-to-analog conversion. In an alternate embodiment of the present invent as shown in FIG. 5, a repeater digital baseband block 453 includes an non-linear element 490 that is placed before the transmit filter 470. Placing the non-linear element 490 before the transmit filter has the advantage of reducing the number of bits required for the transmit filter and thus reducing the complexity of the transmit filter implementation.

Figure 6:
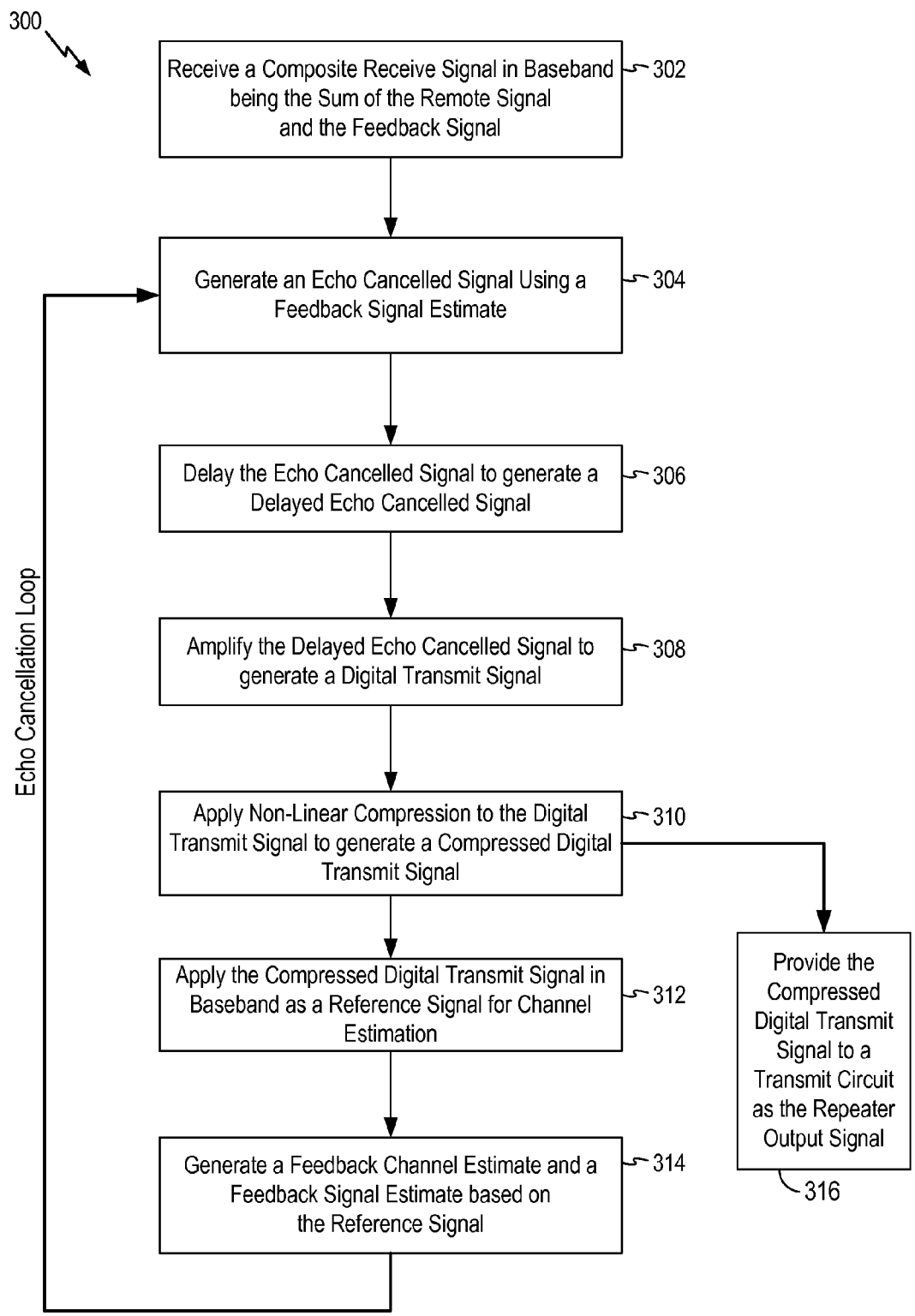
FIG. 6 is a flow chart illustrating a method to incorporate non-linear distortion in the cancellation loop of an interference cancellation repeater according to one embodiment of the present invention.

FIG. 6 is a flow chart illustrating a method to incorporate non-linear distortion in the cancellation loop of an interference cancellation repeater according to one embodiment of the present invention. Referring to FIG. 6, a repeater non-linear distortion compensation method 300 starts by receiving a composite receive signal q[k] being the sum of the desired signal to be repeated, i.e. the remote signal x[k], and a feedback signal w[k] (step 302). Then, echo cancellation is performed to generate an echo cancelled signal p[k] using a feedback signal estimate ŵ[k] (step 304). The echo cancelled signal includes at least the desired receive signal x[k]. Then, the echo cancelled signal is delayed to generate a delayed echo cancelled signal r[k] (step 306). The delayed echo cancelled is then amplified by a variable gain stage to generate a digital transmit signal (step 308).

Method 300 then proceeds to apply a non-linear compression to the digital transmit signal to generate a compressed digital transmit signal (step 310). The non-linear compression is applied to limit the peak-to-average amplitude ratio of the transmit signal to a desired level prior to transmission. The non-linear compression can be applied before or after the transmit filter of the repeater baseband block. The compressed digital transmit signal can then be applied as a reference signal for channel estimation (step 312). A feedback channel estimate can be generated based on the reference signal and a feedback signal estimate can be generated based on the feedback channel estimate and the reference signal (step 314). The feedback signal estimate are then provided to step 304 to complete the echo cancellation loop. At step 304, echo cancellation of the composite receive signal is performed using the feedback signal estimate.

The compressed digital transmit signal generated at step 310 is also provided to the transmit circuit of an analog front-end circuit to be converted to an analog signal and processed for transmission on an antenna as the output signal of the repeater (step 316).

At step 310, the non-linear compression can be applied to all digital transmit signal continuously or the non-linear compression can be applied when the digital transmit signal is at a certain power level or a certain gain level.

The communication system in which the repeater of the present invention can be deployed includes various wireless communication networks based on infrared, radio, and/or microwave technology. Such networks can include, for example, a wireless wide area network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The systems and techniques described herein may also be used for any combination of WWAN, WLAN and/or WPAN.

Those skilled in the art will understand that information and signals may be represented using any of a variety of different technologies and techniques. For example: data, information, signals, bits, symbols, chips, instructions, and commands may be referenced throughout the above description. These may be represented by voltages, currents, electromagnetic waves, magnetic fields or particles, optical fields or particles, or any combination thereof.

In one or more of the above-described embodiments, the functions and processes described may be implemented in hardware, software, firmware, or any combination thereof. If implemented in software, the functions may be stored as one or more instructions or code on a computer-readable medium. The terms "computer readable medium" "storage medium" and the like refer to manufactures and not to transitory propagating signals. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The term "control logic" used herein applies to software (in which functionality is implemented by instructions stored on a machine-readable medium to be executed using a processor), hardware (in which functionality is implemented using circuitry (such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile station or a repeater, and executed by a processor, for example the microprocessor of modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Also, computer instructions/code may be transmitted via signals over physical transmission media from a transmitter to a receiver. For example, if the software is transmitted from a website, server, or other remote source using a coaxial cable, fiber optic cable, twisted pair, digital subscriber line (DSL), or physical components of wireless technologies such as infrared, radio, and microwave. Combinations of the above should also be included within the scope of physical transmission media.

Moreover, the previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A wireless repeater having a first antenna and a second antenna to receive an input signal and transmit an amplified signal, the input signal being a sum of a remote signal to be repeated and a feedback signal resulting from a feedback channel between the first antenna and the second antenna, the repeater comprising:
   a first receiver circuit coupled to the first antenna to receive the input signal and to generate a digital input signals at baseband frequency;
   a first transmitter circuit coupled to generate the amplified signal to transmit on the second antenna, the amplified signal being generated from a compressed digital transmit signal at baseband frequency; and
   a repeater digital baseband block configured to receive the digital input signal from the first receiver circuit and to generate the compressed digital transmit signal for the first transmitter circuit, the repeater baseband block operative to access a feedback signal estimate, to cancel the feedback signal estimate from the digital input signal to generate an echo cancelled signal, to delay the echo cancelled signal to generate a delayed signal, and to amplify and process the delayed signal to generate a first digital transmit signal, the repeater digital baseband block further configured to apply non-linear baseband compression of the first digital transmit signal to generate the compressed digital transmit signal, wherein the repeater baseband block is configured to access a feedback signal estimate using the compressed digital transmit signal as a reference signal.

2. The wireless repeater of claim 1, wherein the repeater digital baseband block is configured to apply non-linear baseband compression of the first digital transmit signal to compress a peak-to-average amplitude ratio of the first digital transmit signal to generate the compressed digital transmit signal.

3. The wireless repeater of claim 1, wherein the repeater digital baseband block is configured to apply non-linear baseband compression of the first digital transmit signal to compress a peak-to-average amplitude ratio of the first digital transmit signal when the first digital transmit signal is at or exceed a predetermined power level.

4. The wireless repeater of claim 1, wherein the repeater digital baseband block is configured to apply non-linear baseband compression of the first digital transmit signal to compress a peak-to-average amplitude ratio of the first digital transmit signal when the first digital transmit signal is at or exceed a predetermined gain level.

5. The wireless repeater of claim 1, wherein the repeater digital baseband block comprises a non-linear element configured to apply the non-linear baseband compression.

6. The wireless repeater of claim 5, wherein the non-linear element implements a digital limiter function.

7. The wireless repeater of claim 5, wherein the repeater digital baseband block comprises a transmit filter configured to filter the first digital transmit signal, the non-linear element being provided before the transmit filter.

8. The wireless repeater of claim 5, wherein the repeater digital baseband block comprises a transmit filter configured to filter the first digital transmit signal, the non-linear element being provided after the transmit filter.

9. A method in an echo cancellation repeater comprising:
   receiving an input signal at a first antenna of the repeater, the input signal being a sum of a remote signal to be repeated and a feedback signal resulting from a feedback channel between the first antenna and a second antenna;
   digitizing the input signal to generate a digital input signal at baseband frequency;
   cancelling a feedback signal estimate from the digital input signal to generate an echo cancelled signal;
   delaying the echo cancelled signal to generate a delayed signal;
   amplifying and processing the delayed signal to generate a first digital transmit signal;
   applying non-linear baseband compression to the first digital transmit signal to generate a compressed digital transmit signal;
   sampling the compressed digital transmit signal as a reference signal to access a feedback channel estimate of the feedback channel;
   generating the feedback signal estimate using at least the feedback channel estimate and the reference signal, the feedback signal estimate being used to cancel a feedback signal component of the digital input signal;
   generating an amplified signal from the compressed digital transmit signal; and
   transmitting the amplified signal on the second antenna of the repeater.

10. The method of claim 9, wherein applying non-linear baseband compression to the first digital transmit signal to generate a compressed digital transmit signal comprises:
   applying non-linear baseband compression to the first digital transmit signal to compress a peak-to-average amplitude ratio of the first digital transmit signal.

11. The method of claim 9, wherein applying non-linear baseband compression to the first digital transmit signal to generate a compressed digital transmit signal comprises:
   applying non-linear baseband compression to the first digital transmit signal to compress a peak-to-average amplitude ratio of the first digital transmit signal when the first digital transmit signal is at or exceed a predetermined power level.

12. The method of claim 9, wherein applying non-linear baseband compression to the first digital transmit signal to generate a compressed digital transmit signal comprises:
   applying non-linear baseband compression to the first digital transmit signal to compress a peak-to-average amplitude ratio of the first digital transmit signal when the first digital transmit signal is at or exceed a predetermined gain level.

13. The method of claim 9, wherein applying non-linear baseband compression to the first digital transmit signal to generate a compressed digital transmit signal comprises:
   applying a digital limiter function as the non-linear baseband compression.

14. The method of claim 9, further comprising filtering the first digital transmit signal before applying non-linear baseband compression to the first digital transmit signal.

15. The method of claim 9, further comprising filtering the first digital transmit signal after applying non-linear baseband compression to the first digital transmit signal.

16. A wireless repeater having a first antenna and a second antenna to receive an input signal and transmit an amplified signal, the input signal being a sum of a remote signal to be repeated and a feedback signal resulting from a feedback channel between the first antenna and the second antenna, the repeater comprising:
   first means coupled to the first antenna for receiving the input signal and to generate a digital input signals at baseband frequency;
   second means for generating the amplified signal to transmit on the second antenna, the amplified signal being generated from a compressed digital transmit signal at baseband frequency; and
   third means for receiving the digital input signal from the first means and generating the compressed digital transmit signal for the second means, the third means for accessing a feedback signal estimate, canceling the feedback signal estimate from the digital input signal to generate an echo cancelled signal, delaying the echo cancelled signal to generate a delayed signal, and amplifying and processing the delayed signal to generate a first digital transmit signal, the third means further for applying non-linear baseband compression of the first digital transmit signal to generate the compressed digital transmit signal,
   wherein the third means is configured for accessing a feedback signal estimate using the compressed digital transmit signal as a reference signal.

17. The wireless repeater of claim 16, wherein the third means is configured for applying non-linear baseband compression of the first digital transmit signal to compress a peak-to-average amplitude ratio of the first digital transmit signal to generate the compressed digital transmit signal.

18. The wireless repeater of claim 16, wherein the third means is configured for applying non-linear baseband compression of the first digital transmit signal to compress a peak-to-average amplitude ratio of the first digital transmit signal when the first digital transmit signal is at or exceed a predetermined power level.

19. The wireless repeater of claim 16, wherein the third means is configured for applying non-linear baseband compression of the first digital transmit signal to compress a peak-to-average amplitude ratio of the first digital transmit signal when the first digital transmit signal is at or exceed a predetermined gain level.

20. A computer readable medium having stored thereon computer executable instructions for performing at least the following acts:

receiving an input signal at a first antenna of an echo cancellation repeater, the input signal being a sum of a remote signal to be repeated and a feedback signal resulting from a feedback channel between the first antenna and a second antenna of the repeater;

digitizing the input signal to generate a digital input signal at baseband frequency;

cancelling a feedback signal estimate from the digital input signal to generate an echo cancelled signal;

delaying the echo cancelled signal to generate a delayed signal;

amplifying and processing the delayed signal to generate a first digital transmit signal;

applying non-linear baseband compression to the first digital transmit signal to generate a compressed digital transmit signal;

sampling the compressed digital transmit signal as a reference signal to access a feedback channel estimate of the feedback channel;

generating the feedback signal estimate using at least the feedback channel estimate and the reference signal, the feedback signal estimate being used to cancel a feedback signal component of the digital input signal;

generating an amplified signal from the compressed digital transmit signal; and transmitting the amplified signal on the second antenna of the repeater.

* * * * *